United States Patent [19]
Kakutani et al.

[11] Patent Number: 6,141,865
[45] Date of Patent: Nov. 7, 2000

[54] WINDING METHOD AND WINDING APPARATUS FOR PRODUCING STATORS FOR ELECTRIC MOTORS

[75] Inventors: Osamu Kakutani; Yousuke Narita, both of Utsunomiya; Hideto Muraoka, Tochigi-ken; Norihisa Watanabe, Utsunomiya, all of Japan

[73] Assignee: Honda Giken Kogyo Kabushiki Kaisha, Tokyo, Japan

[21] Appl. No.: 09/148,703

[22] Filed: Sep. 4, 1998

[30] Foreign Application Priority Data

| Sep. 4, 1997 | [JP] | Japan | 9-239828 |
| Sep. 4, 1997 | [JP] | Japan | 9-239833 |
| Sep. 4, 1997 | [JP] | Japan | 9-239834 |

[51] Int. Cl.⁷ .......... B23P 19/00; H01R 43/06; B21F 3/00; H02K 15/09
[52] U.S. Cl. .......... 29/733; 29/732; 29/464; 29/606; 29/564.5; 29/597; 242/433; 140/92.1
[58] Field of Search .......... 29/732, 733, 734, 29/464, 467, 606, 564.5, 596, 243.518, 281.5, 597; 242/433, 433.4; 140/92.1

[56] References Cited

U.S. PATENT DOCUMENTS

| 2,955,622 | 10/1960 | Spotten et al. | 140/92.1 |
| 3,914,859 | 10/1975 | Pierson | 29/606 |
| 4,563,808 | 1/1986 | Lender | 29/606 |
| 4,901,433 | 2/1990 | Barrera | 29/734 |
| 5,060,364 | 10/1991 | Scherer | 29/734 |
| 5,090,110 | 2/1992 | Murakoshi et al. | 29/734 |
| 5,507,322 | 4/1996 | Nasrallah | 140/92.1 |
| 5,536,145 | 7/1996 | Vandendriessche | 29/464 |
| 5,774,976 | 7/1998 | Stark | 29/732 |
| 5,896,648 | 4/1999 | Brown et al. | 29/732 |

FOREIGN PATENT DOCUMENTS

| 0154763A2 | 9/1985 | European Pat. Off. | 29/732 |
| 154763 | 9/1985 | European Pat. Off. | 29/732 |
| 7163070 | 6/1995 | Japan . | |

*Primary Examiner*—Lee Young
*Assistant Examiner*—A. Dexter Tugbang

[57] ABSTRACT

A winding apparatus comprises a core jig having a circular outer circumference, plate-shaped stator core jigs designed to have a shape corresponding to stator cores, and holding jigs to be detachably installed to the outer circumference of the core jig for holding the stator core jigs. Accordingly, the plurality of divided stator cores can be subjected to winding quickly and easily. It is possible to perform an efficient winding operation.

6 Claims, 20 Drawing Sheets

FIG. 8
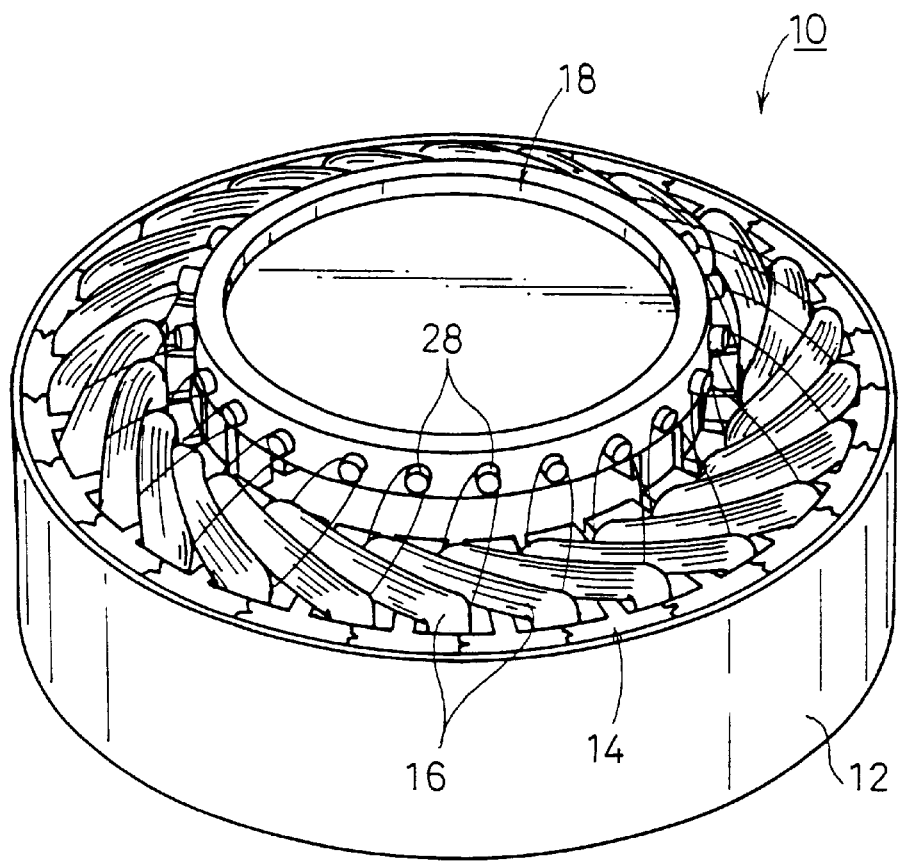
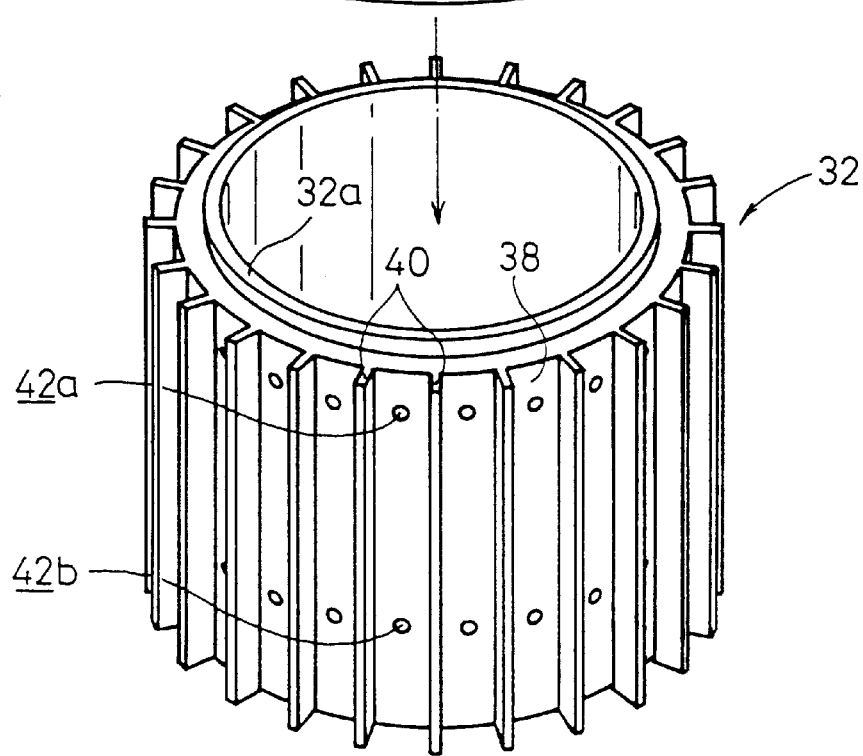

F I G. 10
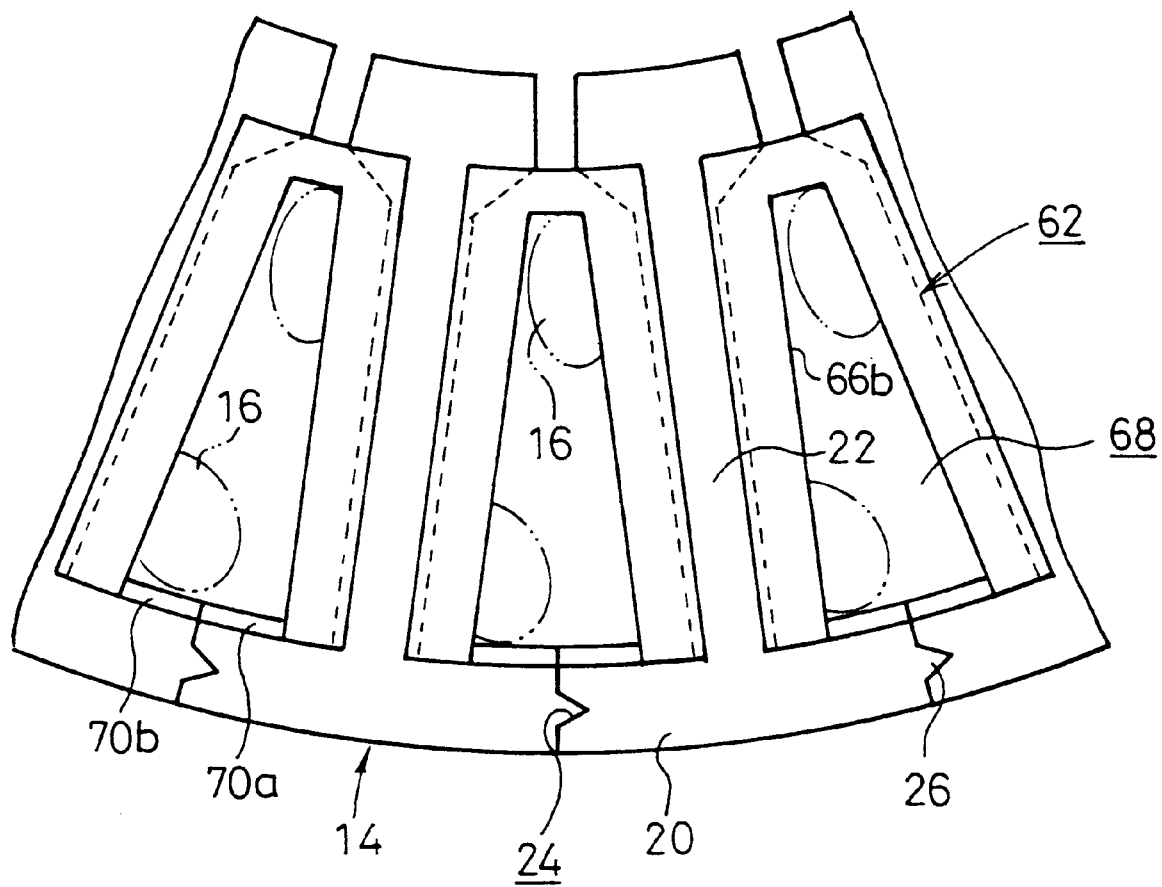

F I G. 13
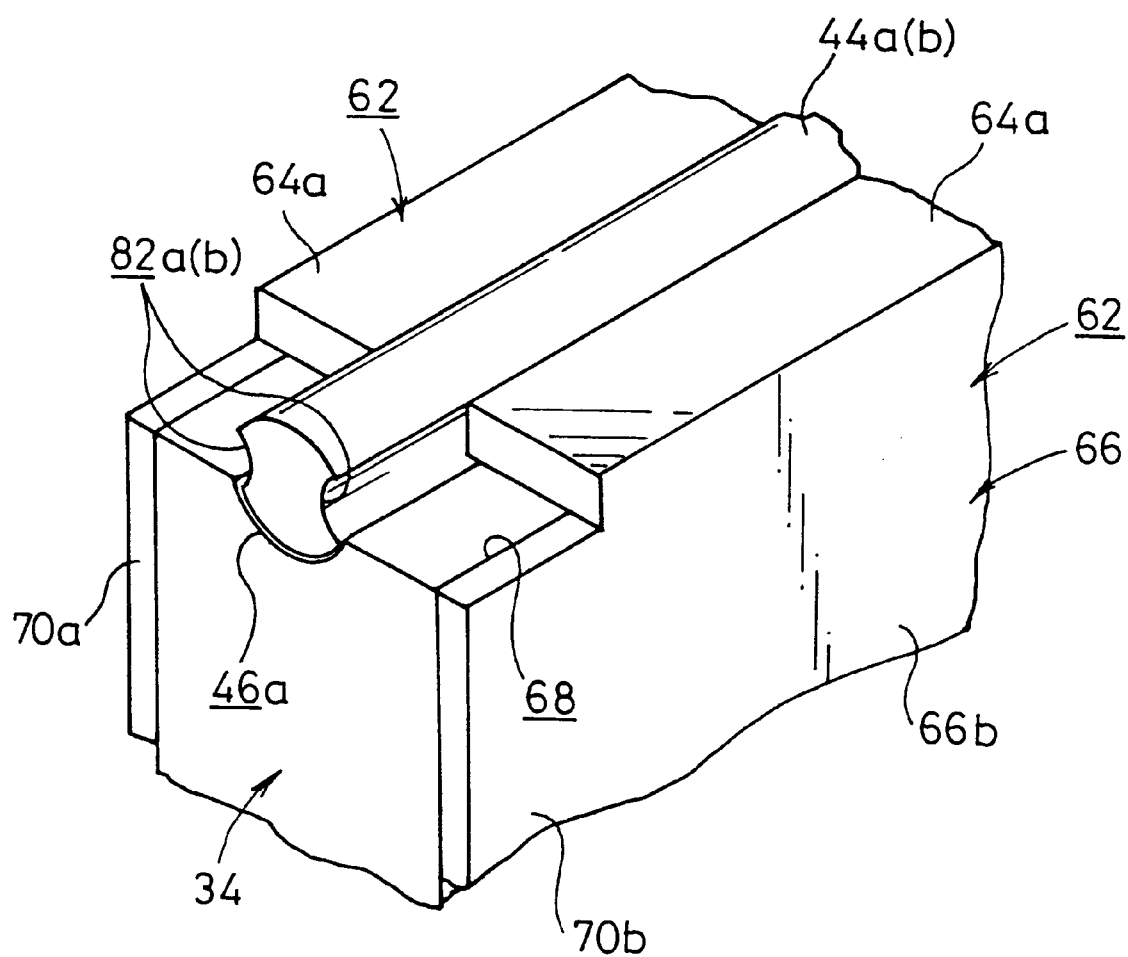

FIG. 20
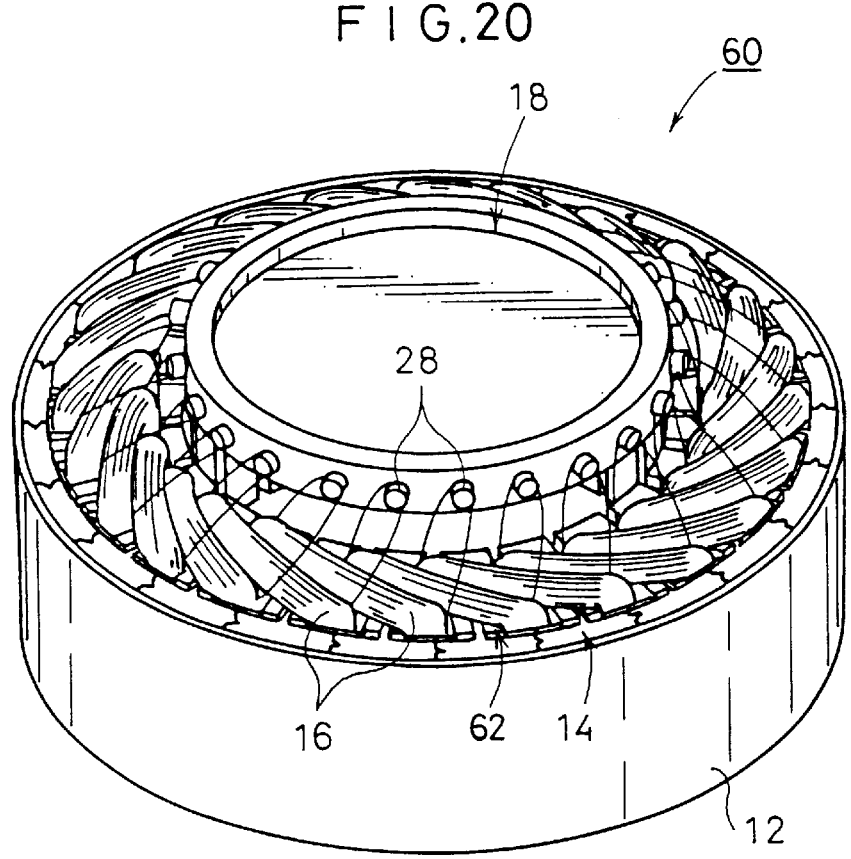
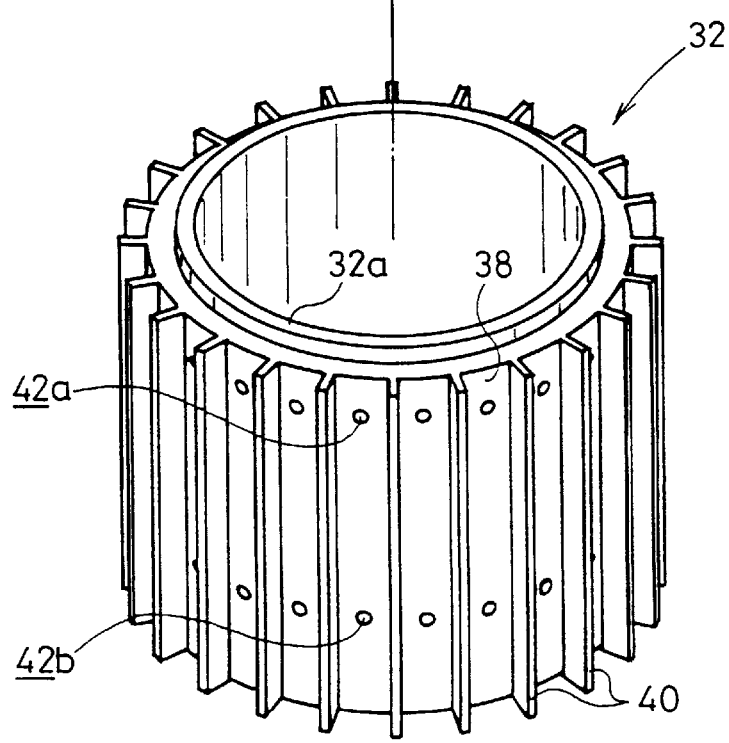

WINDING METHOD AND WINDING APPARATUS FOR PRODUCING STATORS FOR ELECTRIC MOTORS

BACKGROUND OF THE INVENTION

1. Field of the Invention

The present invention relates to a winding method and a winding apparatus for producing stators for electric motors, wherein a plurality of stator cores divided to have a tooths-haped configuration are assembled into an annular structure, and the stator cores are subjected to winding to form a stator.

2. Description of the Related Art

A conventional stator for an electric motor has a structure comprising a plurality of radially directed projections which are formed on an inner circumferential surface of a substantially cylindrical body, including a lead wire which is wound onto grooves of the projections. Therefore, the conventional stator has had an inconvenience that the operation for winding the lead wire is extremely complicated.

In view of such an inconvenience, a method for producing a stator is known, as disclosed in Japanese Laid-Open Patent Publication No. 7-163070, in which a plurality of divided stator cores are prepared. A lead wire is wound onto each of the stator cores, and then the stator cores are fitted to one another to form an annular configuration so that the stator is produced.

In general, those adopted for producing the stator include the centralized winding coil system in which the lead wire is wound onto each of the stator cores as described above, as well as the lap winding coil system in which the lead wire is wound onto the stator cores while spanning a plurality of stator cores. However, in the case of such a lap winding coil system, it is difficult to apply the foregoing conventional technique thereto.

For this reason, an operation is generally adopted, in which an open stator is integrally formed to apply a lap winding coil thereto. However, the material is consumed at a poor yield in the press punching step for integrally forming the open stator. As a result, a problem is pointed out in that this process is extremely uneconomical. Further, the operation for winding the lead wire is complicated, and a problem arises in that the productivity is low.

Additionally, in the case of a commutator motor, it is necessary that a commutator member (commutator) is subjected to winding. Therefore, the operation for winding the lead wire is considerably complicated, and a problem arises in that the productivity is extremely low.

On the other hand, an insulator (insulating material) is usually allowed to intervene between a stator core and a coil in order to prevent the both from electric connection. Therefore, the operation for winding the lead wire while allowing the insulator to intervene therebetween is considerably complicated. As a result, a problem arises in that the productivity is extremely low.

SUMMARY OF THE INVENTION

A general object of the present invention is to provide a winding method and a winding apparatus for producing stators for electric motors, in which a plurality of divided stator cores can be subjected to winding quickly and easily, and it is possible to perform an efficient winding operation.

A principal object of the present invention is to provide a winding method and a winding apparatus for producing stators for electric motors, in which a plurality of divided stator cores and a commutator member can be subjected to winding quickly and easily, and it is possible to perform an efficient winding operation.

Another principal object of the present invention is to provide a winding method and a winding apparatus for producing stators for electric motors, in which a plurality of divided stator cores can be subjected to winding quickly and easily while allowing insulators to intervene therebetween, and it is possible to perform an efficient winding operation.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 shows a perspective view illustrating a process in which the core jig is removed;

FIG. 10 shows a partial plan view illustrating the stator;

FIG. 13 shows a partial perspective view illustrating the insulators and a stator core jig;

FIG. 20 shows a perspective view illustrating a process in which the core jig is removed.

DESCRIPTION OF THE PREFERRED EMBODIMENTS

Figure 1:
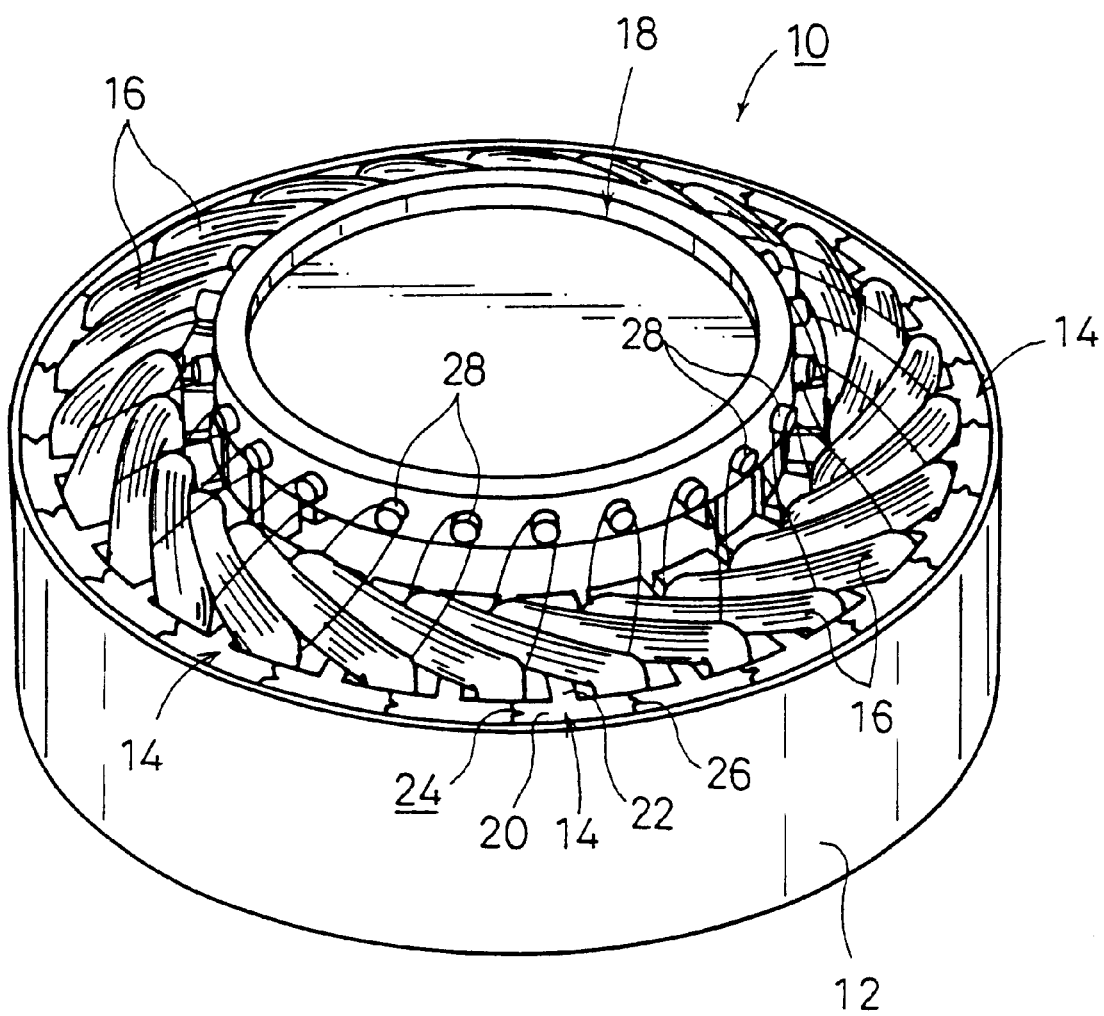
FIG. 1 shows a perspective view illustrating a stator to which a winding method for producing stators for electric motors according to a first embodiment of the present invention is applied.

FIG. 1 shows a perspective view illustrating a stator 10 obtained in accordance with a winding method for producing stators for electric motors according to a first embodiment of the present invention. The stator 10 comprises a plurality of stator cores 14 divided to have a tooth-shaped configuration, the stator cores 14 being arranged and held in an annular form in an outer diametral ring 12, a plurality of winding coils 16 wound onto the stator cores 14 to span a predetermined number of the stator cores 14, and a commutator member 18 subjected to winding of the winding coils 16.

The stator core 14 comprises a predetermined number of stacked plates composed of an iron material having elasticity, each of the plates having an identical shape. Alternatively, the stator core 14 is integrally formed of an iron material by means of casting. The stator core 14 is formed to have a substantially T-shaped configuration provided with a head 20 and a leg 22. The head 20 has its one end in the circumferential direction at which a recess 24 for forming a circular arc-shaped space is provided. A circular arc-shaped projection 26 is provided at the other end of the head 20 in the circumferential direction. The commutator member 18 is formed to have a ring-shaped configuration. Winding fastening pins 28, which are separated from each other by equal angular intervals, are provided on the outer circumference of the commutator member 18.

Figure 2:
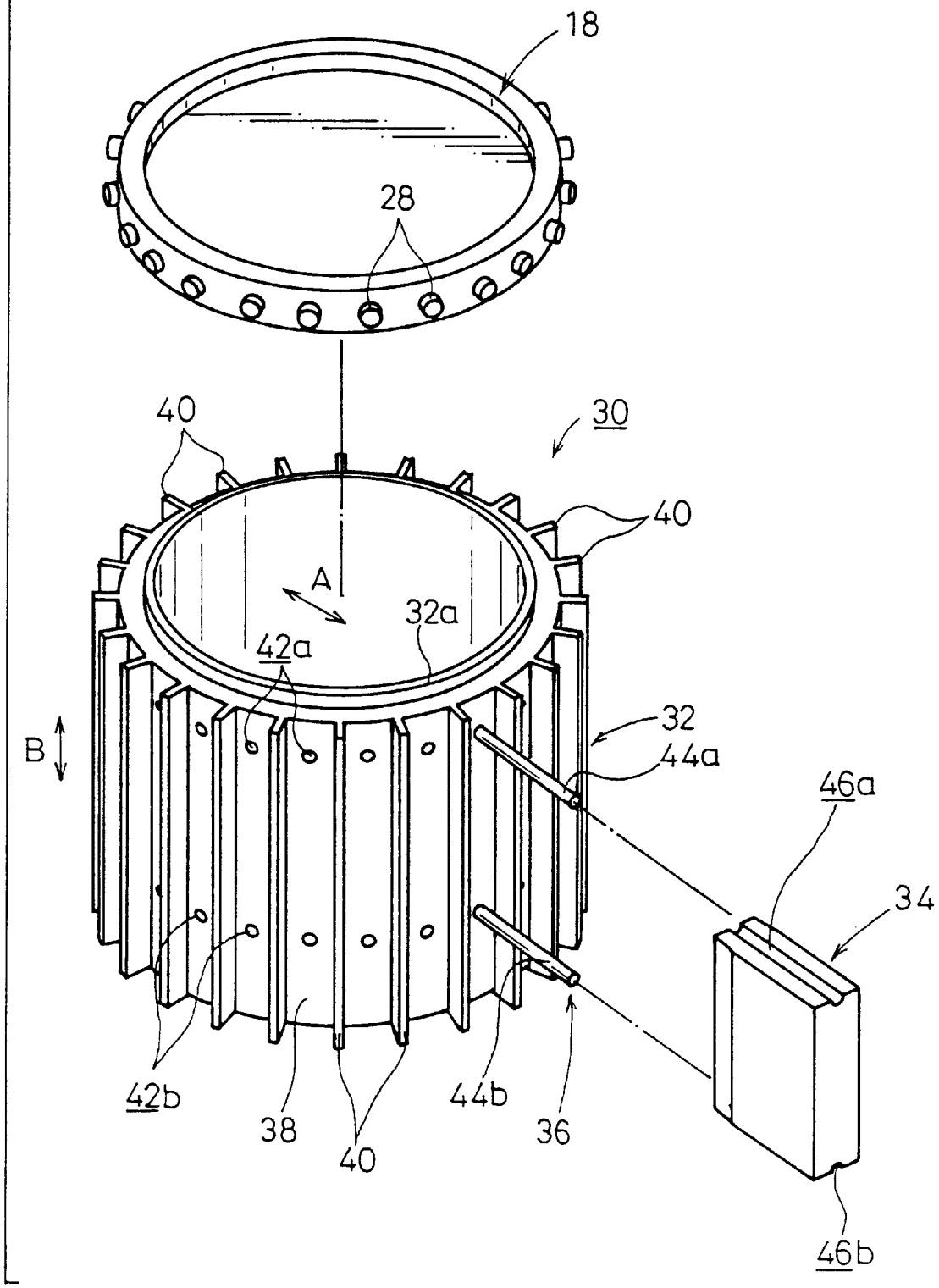
FIG. 2 shows a partial exploded perspective view illustrating a winding apparatus for carrying out the winding method.

FIG. 2 shows a partial exploded perspective view illustrating a winding apparatus 30 for carrying out the winding method. The winding apparatus 30 comprises a core jig 32 having a circular outer circumference, plate-shaped stator core jigs 34 designed to have a shape corresponding to the stator core 14, and holding jigs 36 installed detachably to the outer circumference of the core jig 32, for holding the stator core jigs 34.

The core jig 32 is designed to have a substantially cylindrical configuration. Plate-shaped projections 40, which are separated from each other by equal angular intervals, which protrude by a predetermined length in the radial direction (direction indicated by the arrow A), and which extend in the axial direction (direction indicated by the arrow B), are formed on a outer circumferential surface 38 of the core jig 32. The length of the projection 40 in the radial direction is designed corresponding to a length from the end of the leg 22 of the stator core 14 to a portion which is subjected to winding.

Holes 42a, 42b, which are located between the respective projections 40 and which are separated from each other in the axial direction corresponding to the dimension of the stator core 14 in the thickness direction, are formed on the outer circumferential surface 38 of the core jig 32. One end 32a of the core jig 32 has its outer diameter which is designed to be fitted to the commutator member 18.

The holding jig 36 comprises a plurality pairs of pin members 44a, 44b which are disengageably installed to the hole 42a, 42b of the core jig 32. The stator core jig 34 is designed to have a substantially rectangular configuration corresponding to the shape of the leg 22 of the stator core 14. Positioning recesses 46a, 46b, with which the respective pairs of pin members 44a, 44b are engaged, are formed on both upper and lower end surfaces of the stator core jig 34.

Next, explanation will be made for the winding method according to the first embodiment for obtaining the stator 10 by using the winding apparatus 30 constructed as described above.

Figure 3:
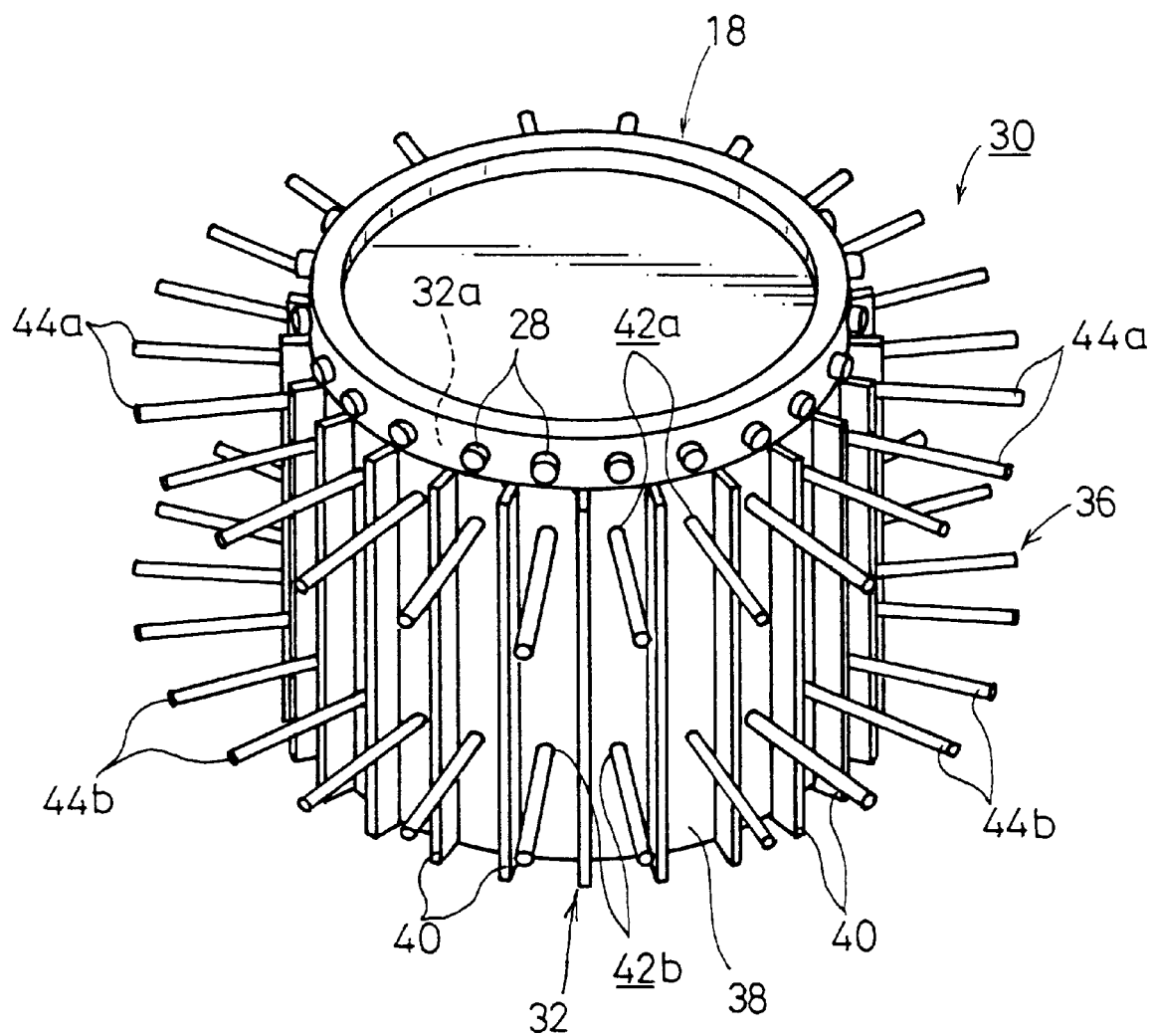
FIG. 3 shows a perspective view illustrating a state in which holding jigs are installed to a core jig for constructing the winding apparatus.
Figure 4:
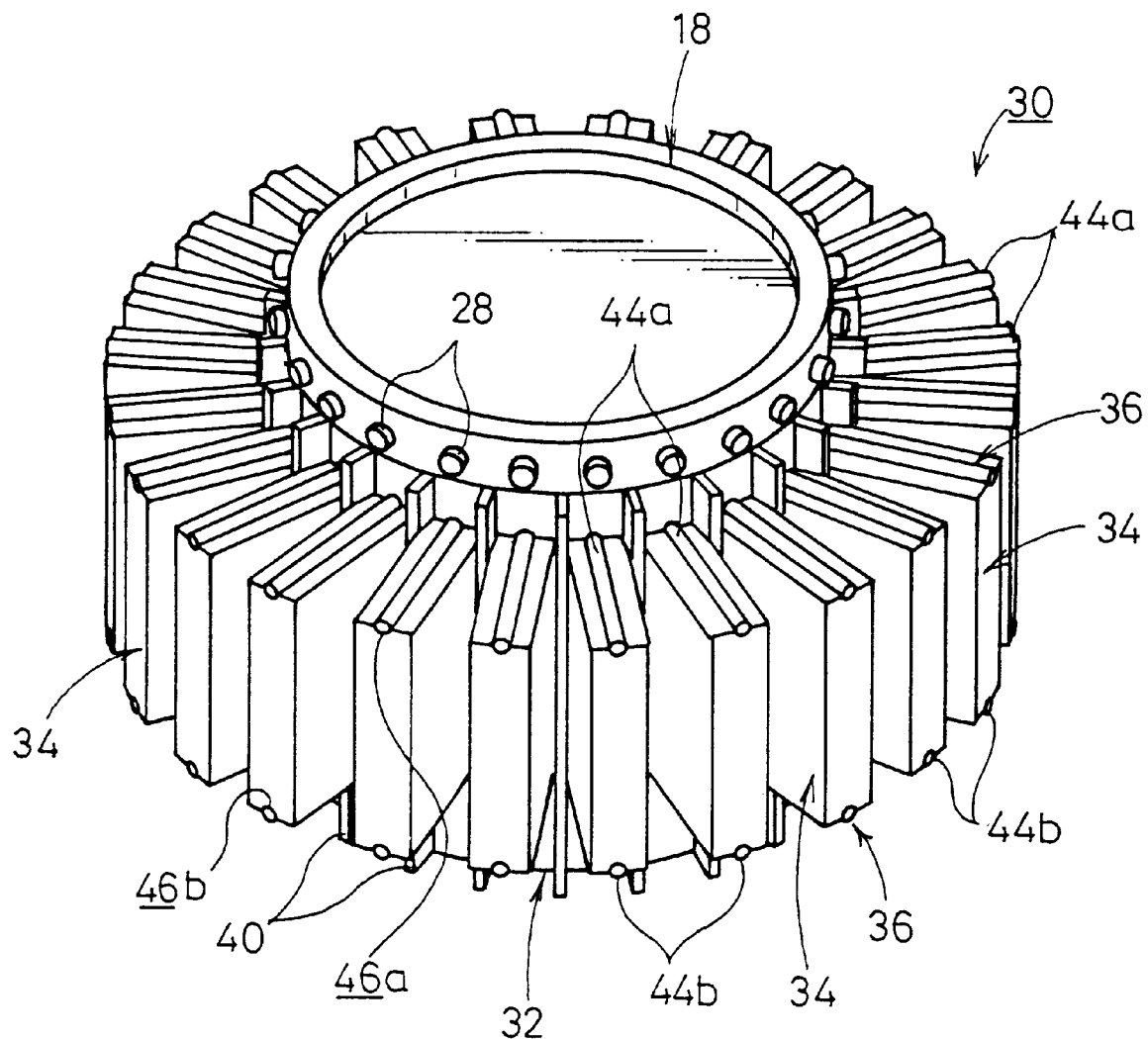
FIG. 4 shows a perspective view illustrating a state in which stator core jigs are installed to the core jig.

At first, as shown in FIG. 3, the one end 32a of the core jig 32 is fitted to the commutator member 18, and thus the commutator member 18 is attached to the core jig 32. On the other hand, the ends of the respective pin members 44a, 44b, which construct the holding jigs 36, are inserted into the respective holes 42a, 42b formed on the outer circumferential surface 38 of the core jig 32. After that, the stator core jigs 34, which are held by the pin members 44a, 44b, are installed to the core jig 32 (see FIG. 4).

Figure 5:
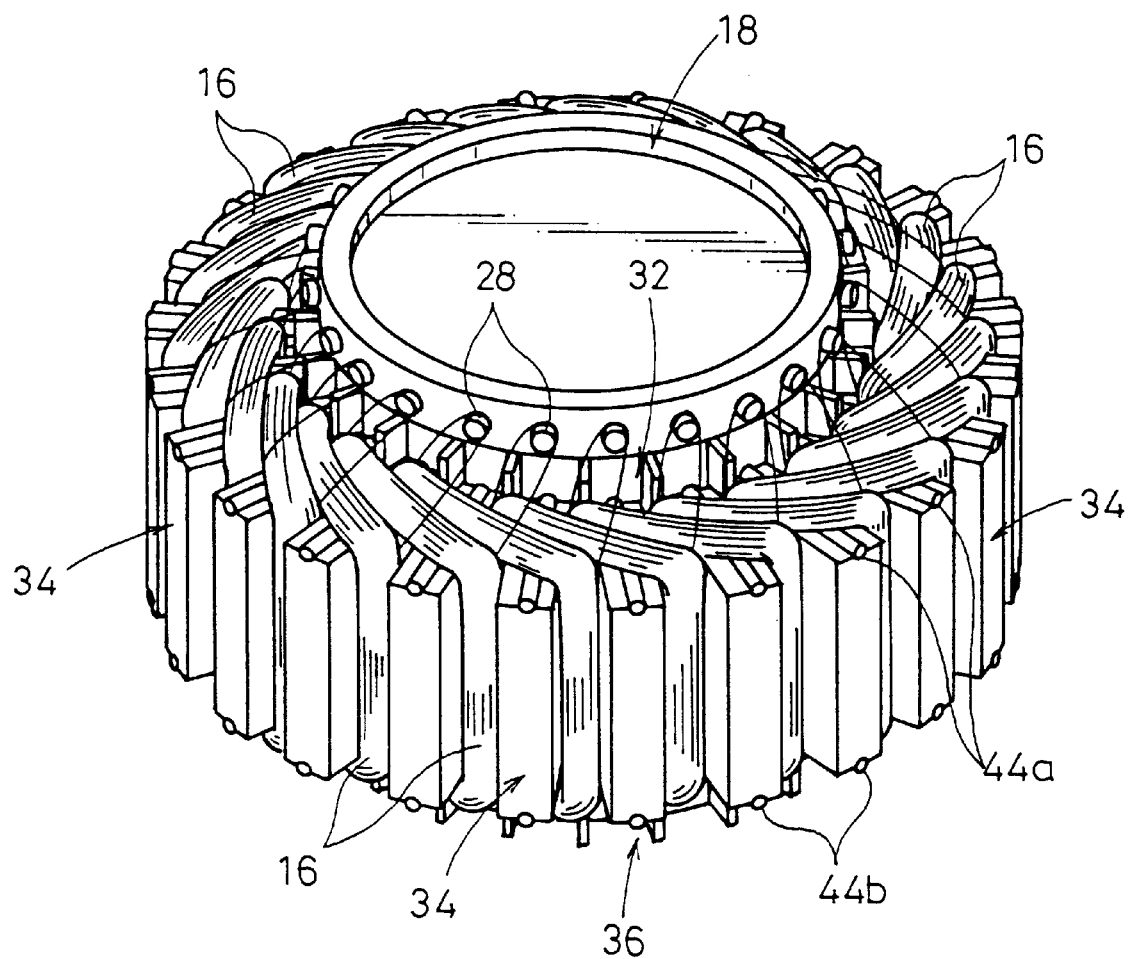
FIG. 5 shows a perspective view illustrating a process in which the core jig is subjected to winding by the aid of the holding jigs and the stator core jigs.

Subsequently, as shown in FIG. 5, the stator core jigs 34 and the pin members 44a, 44b are subjected to winding in an integrated manner. Thus, the winding coils 16 are formed around the core jig 32. During this process, the fastening pins 28, which are provided on the commutator member 18, are subjected to winding. The core jig 32 is provided with the plurality of projections 40 which protrude in the radial direction. The stator core jigs 34 are not subjected to winding at their regions corresponding to the length of the projections 40 in the radial direction, because of the following reason. That is, it is intended to provide non-winding regions on the legs 22 of the stator cores 14.

Figure 6:
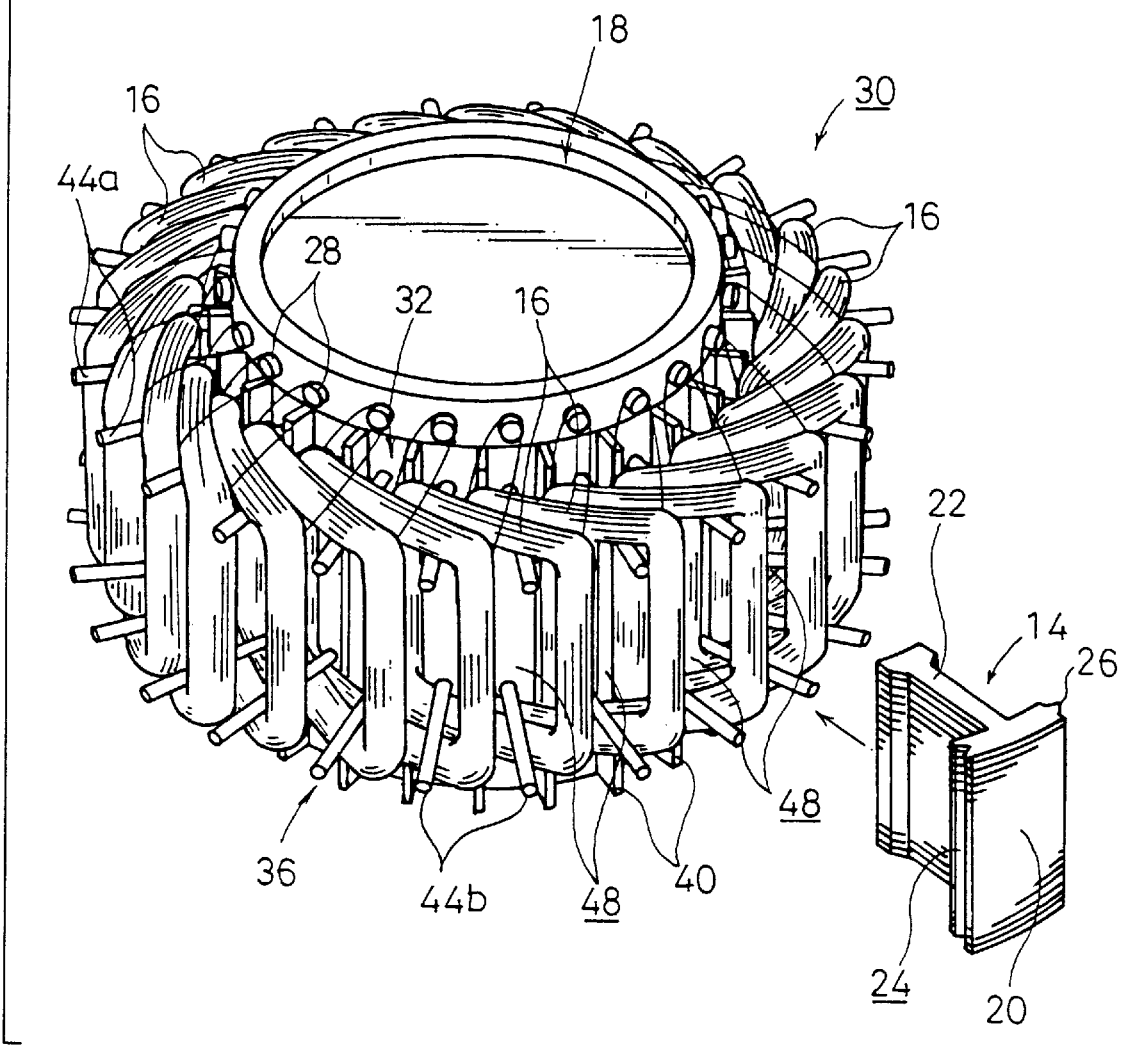
FIG. 6 shows a perspective view illustrating a process in which stator cores are installed to the windings in place of the stator core jigs.
Figure 7:
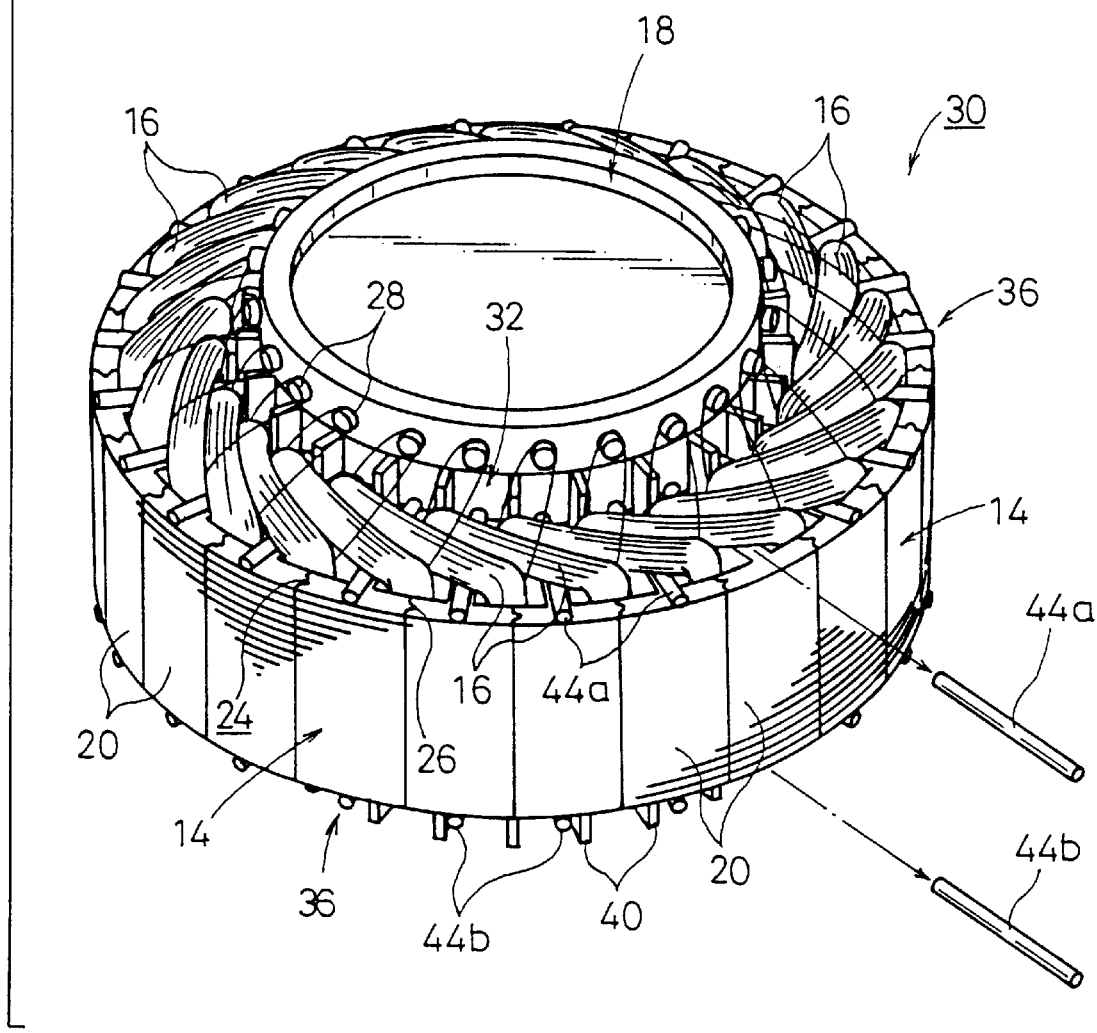
FIG. 7 shows a perspective view illustrating a state in which the stator cores are installed.

After completion of the winding operation, the stator core jigs 34 are removed from the core jig 32. When the stator core jigs 34 are removed, as shown in FIG. 6, openings 48 are formed by the winding coils 16 and the pin members 44a, 44b. The stator cores 14 are inserted into the openings 48. Specifically, the legs 22 of the stator cores 14 are successively inserted into the openings 48. The recess 24, which is provided at the head 20 of one stator core 14, is fitted to the projection 26 which is provided at the head 20 of the other stator core 14. Accordingly, as shown in FIG. 7, the respective stator cores 14 are arranged in the annular configuration.

Further, the pin members 44a, 44b are withdrawn from the core jig 32, and then the outer diametral ring 12 is installed to the outer circumference of the stator cores 14 (see FIG. 8). The core jig 32 is removed from the winding coils 16. Thus, the stator 10 is obtained.

In this first embodiment, at first, the stator core jigs 34 and the holding jigs 36 therefor are subjected to winding to form the winding coils 16 in the state in which the stator core jigs 34 are installed to the core jig 32 by the aid of the holding jigs 36. Subsequently, the stator core jigs 34 are replaced with the stator cores 14 which are installed to the openings 48 of the winding coils 16. The holding jigs 36 and the core jig 32 are removed from the winding coils 16.

As described above, the winding coils 16 can be wound onto the stator cores 14 to span the predetermined number of stator cores 14 only by inserting the plurality of divided stator cores 14 into the respective openings 48. Accordingly, the first embodiment makes it possible to effectively avoid the decrease in yield to be achieved starting from the material. The decrease in yield would be otherwise caused, for example, when the conventional open stator is formed in an integrated manner. It is possible to obtain an effect that the process is extremely economical. Further, an advantage is obtained in that the productivity is improved all at once, and the entire winding operation is performed easily and quickly.

The holding jigs 36 comprise the pin members 44a, 44b to be installed to the core jig 32, while the stator core jigs 34 are provided with the positioning recesses 46a, 46b for making engagement with the pin members 44a, 44b. Accordingly, the stator core jigs 34 can be held accurately and reliably with respect to the core jig 32. Thus, an effect is obtained in that the winding operation can be performed to give a high quality by using the simple structure.

In the first embodiment, the holding jigs 36 and the commutator member 18 are subjected to winding to form the winding coils 16 in the state in which the stator core jigs 34 are installed by the aid of the holding jigs 36 to the core jig 32 to which the commutator member 18 is attached. Subsequently, the stator core jigs 34 are replaced with the stator cores 14 which are installed to the openings 48 of the winding coils 16. After the holding jigs 36 are removed from the winding coils 16, the core jig 32 is removed from the commutator member 18.

As described above, the winding coils 16 can be wound onto the stator cores 14 to span the. predetermined number of stator cores 14 only by inserting the plurality of divided stator cores 14 into the respective openings 48. Accordingly, the winding operation for the commutator member 18 is effectively simplified. Therefore, an advantage is obtained in that the productivity of the commutator motor is improved all at once, and the entire winding operation is performed easily and quickly.

Figure 9:
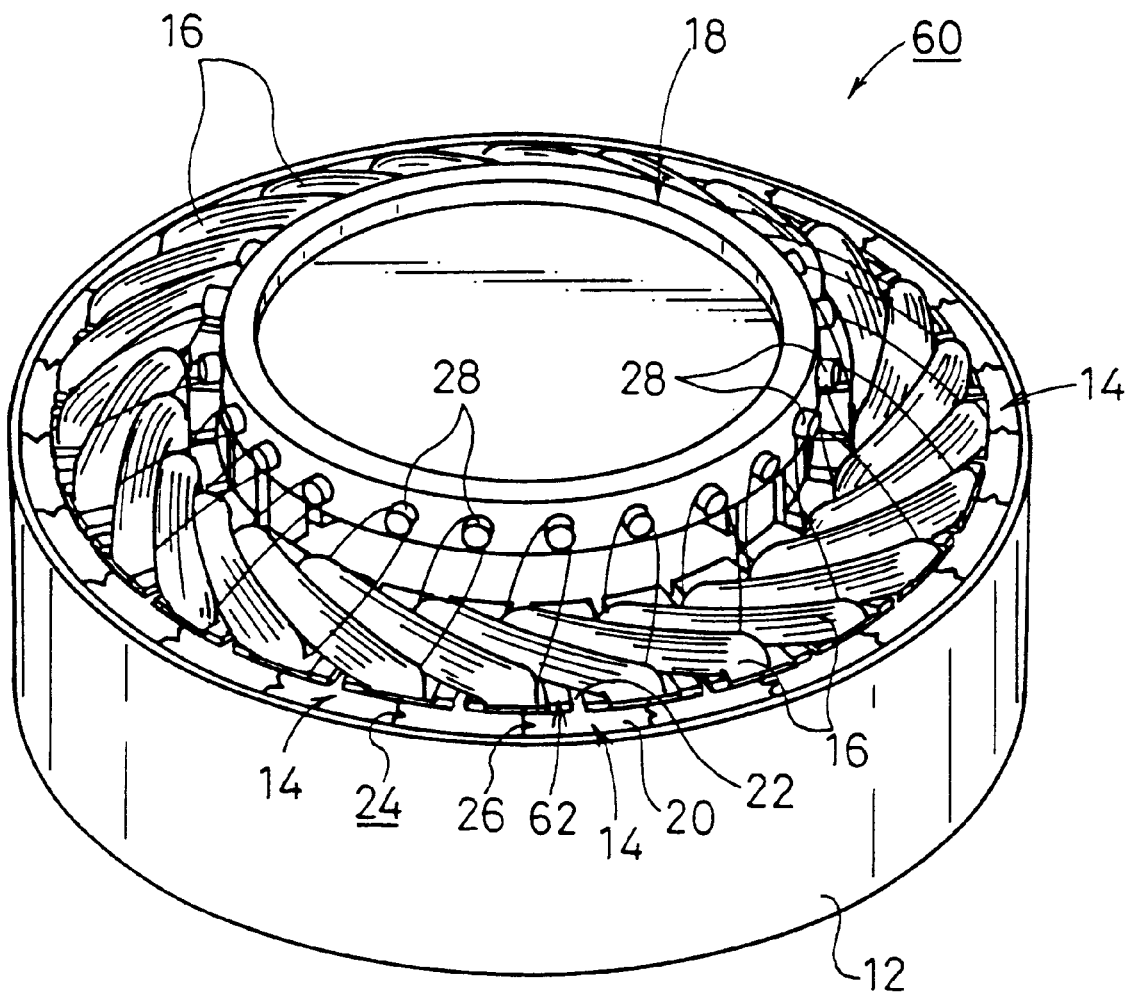
FIG. 9 shows a perspective view illustrating a stator to which a winding method for producing stators for electric motors according to a second embodiment of the present invention is applied.

FIG. 9 shows a perspective view illustrating a stator 60 which is obtained in accordance with a winding method for producing stators for electric motors according to a second embodiment of the present invention. The same constitutive elements as those of the stator 10 according to the first embodiment are designated by the same reference numerals, detailed explanation of which will be omitted.

Figure 11:
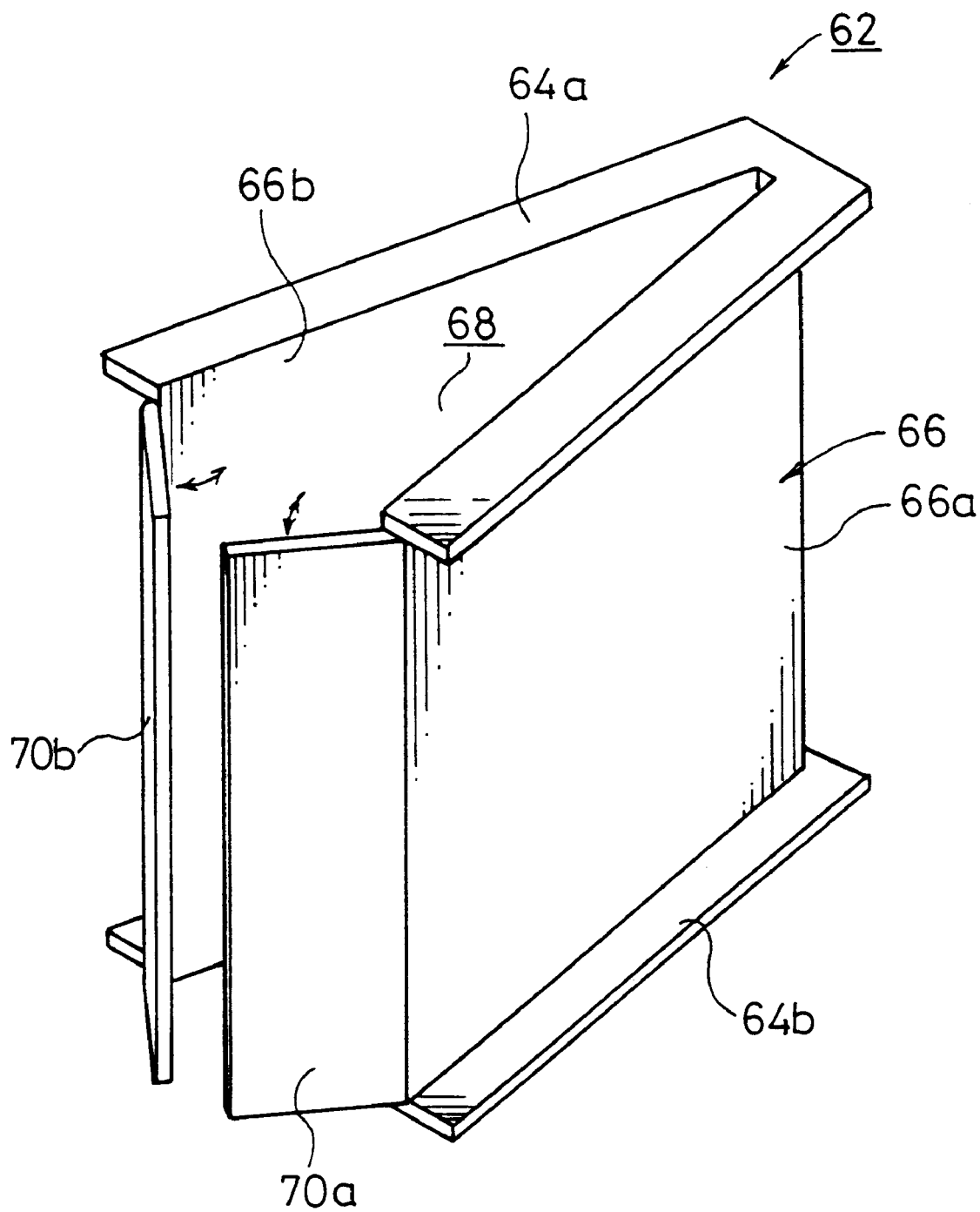
FIG. 11 shows a perspective view illustrating an insulator for constructing the stator.

The stator 60 comprises insulators 62 which are interposed between the stator cores 14 and the winding coils 16. As shown in FIGS. 10 and 11, the insulator 62 has an angular U-shaped vertical cross section, and it is formed to have a substantially angular U-shaped configuration as a whole. Specifically, the insulator 62 is provided with upper and lower angular U-shaped horizontal plates 64a, 64b which are parallel to one another. An angular U-shaped vertical plate 66 is integrally formed between the horizontal plates 64a, 64b. An outer surface 66a of the vertical plate 66 abuts against the stator core jigs 34, and it is held thereby. A winding opening 68 is formed by an inner surface 66b of the vertical plate 66. Bending protruding tabs 70a, 70b are formed at ends of the vertical plate 66.

Figure 12:
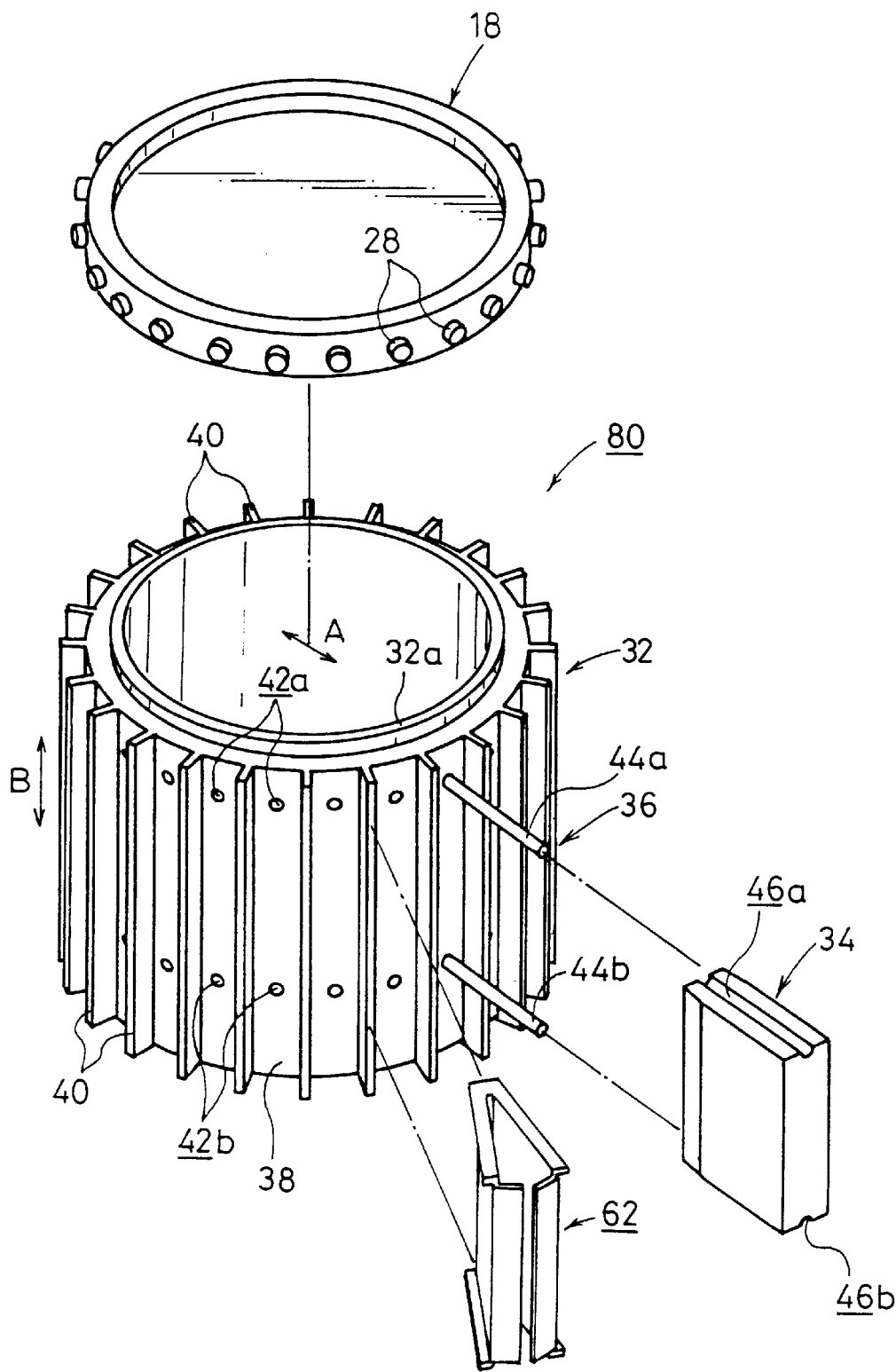
FIG. 12 shows a partial exploded perspective view illustrating a winding apparatus for carrying out the winding method.

FIG. 12 shows a partial exploded perspective view illustrating a winding apparatus 80 for carrying out the winding method. The same constitutive elements as those of the winding apparatus 30 according to the first embodiment are designated by the same reference numerals, detailed explanation of which will be omitted. As shown in FIG. 13, each of the pin members 44a, 44b has circular arc-shaped recesses 82a, 82b which are disposed on both sides in the diametral direction for making engagement with the horizontal plates 64a, 64b of the insulators 60.

Next, explanation will be made for the winding method according to the second embodiment for obtaining the stator 60 by using the winding apparatus 80 constructed as described above.

Figure 14:
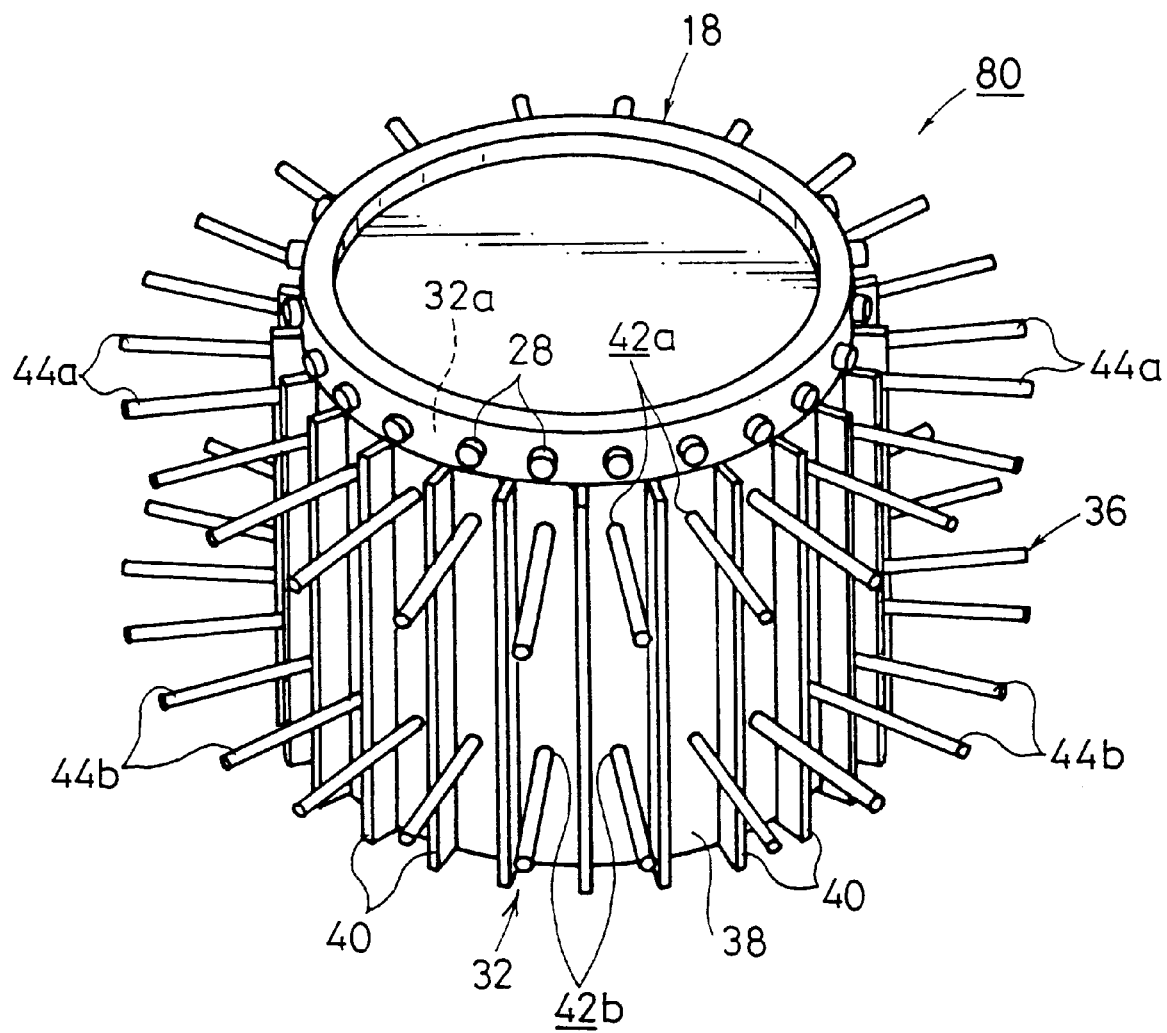
FIG. 14 shows a perspective view illustrating a state in which holding jigs are installed to a core jig for constructing the winding apparatus.
Figure 15:
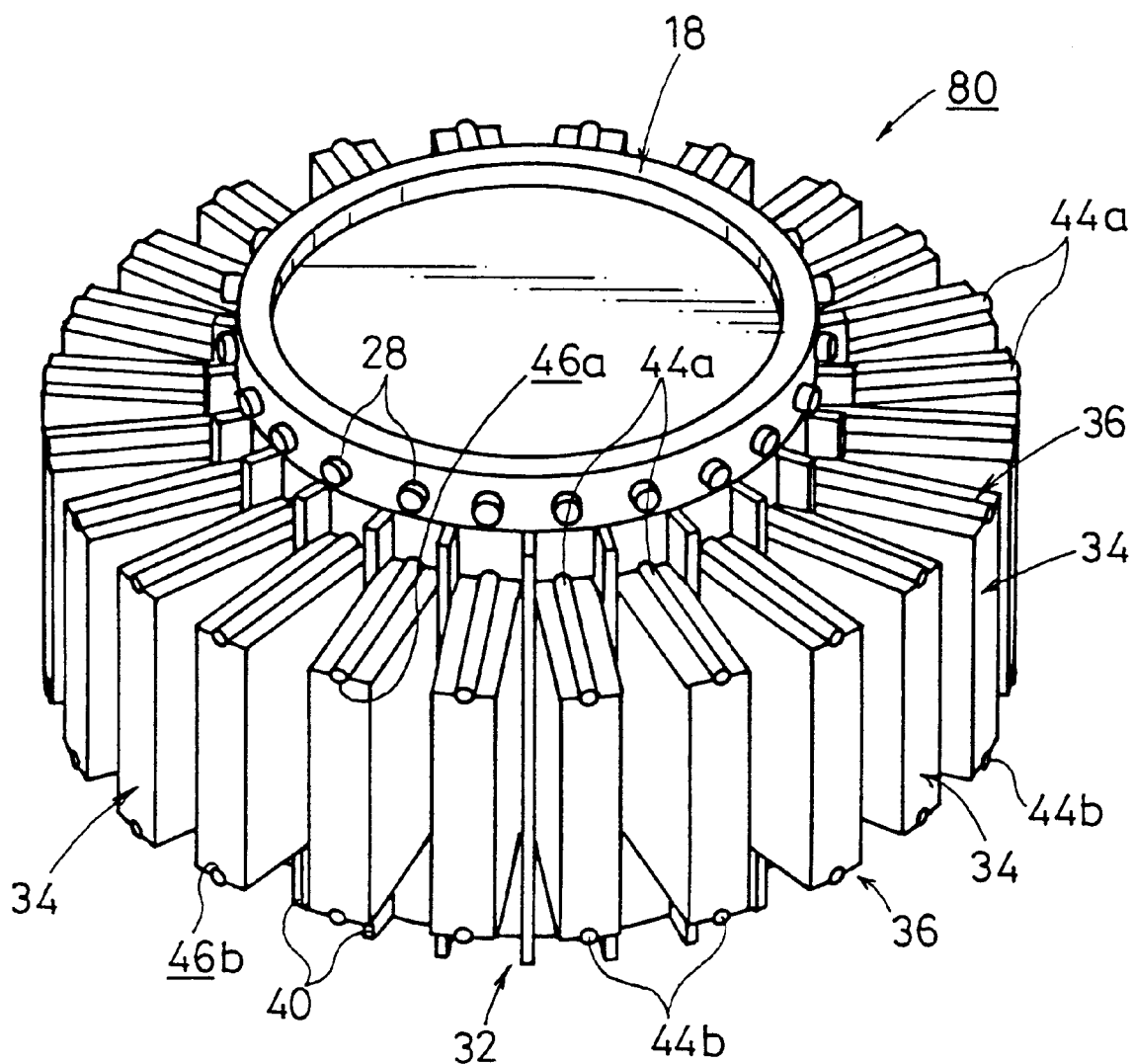
FIG. 15 shows a perspective view illustrating a state in which the stator core jigs are installed to the core jig.

At first, as shown in FIG. 14, the one end 32a of the core jig 32 is fitted to the commutator member 18, and thus the commutator member 18 is attached to the core jig 32. On the other hand, the ends of the respective pin members 44a, 44b, which construct the holding jigs 36, are inserted into the respective holes 42a, 42b formed on the outer circumferential surface 38 of the core jig 32. After that, the stator core jigs 34, which are held by the pin members 44a, 44b, are installed to the core jig 32 (see FIG. 15).

Figure 16:
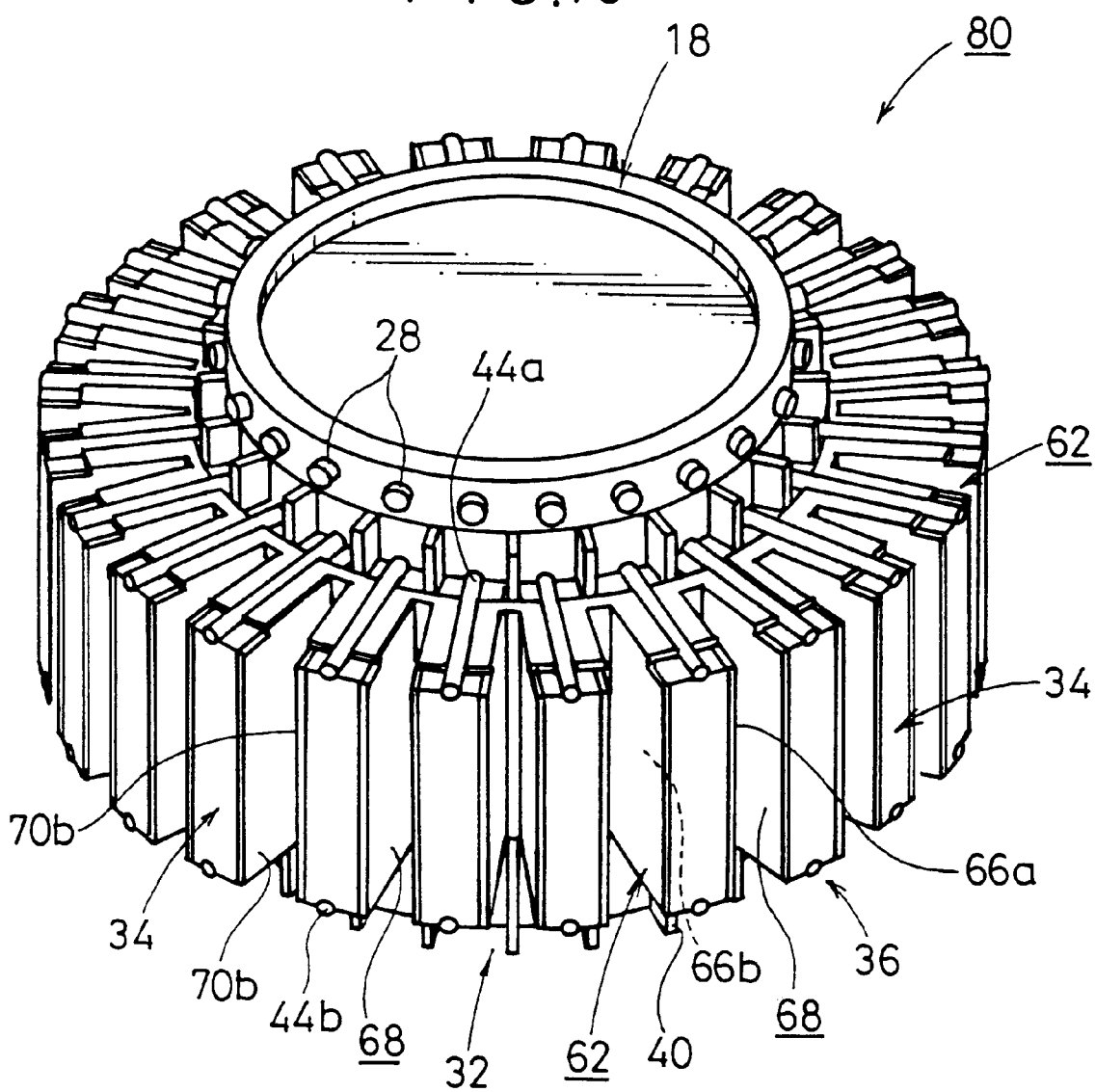
FIG. 16 shows a process in which the insulators are installed between the stator core jigs.

Subsequently, as shown in FIG. 16, the insulators 62 are inserted into spaces between the stator core jigs 34. During this process, the outer surface 66a of the vertical plate 66 of the insulator 62 abuts against the side surfaces of the mutually adjacent stator core jigs 34, and it is held thereby. The winding openings 68 are formed by the inner surfaces 66b. The bending protruding tabs 70a, 70b project outwardly.

Figure 17:
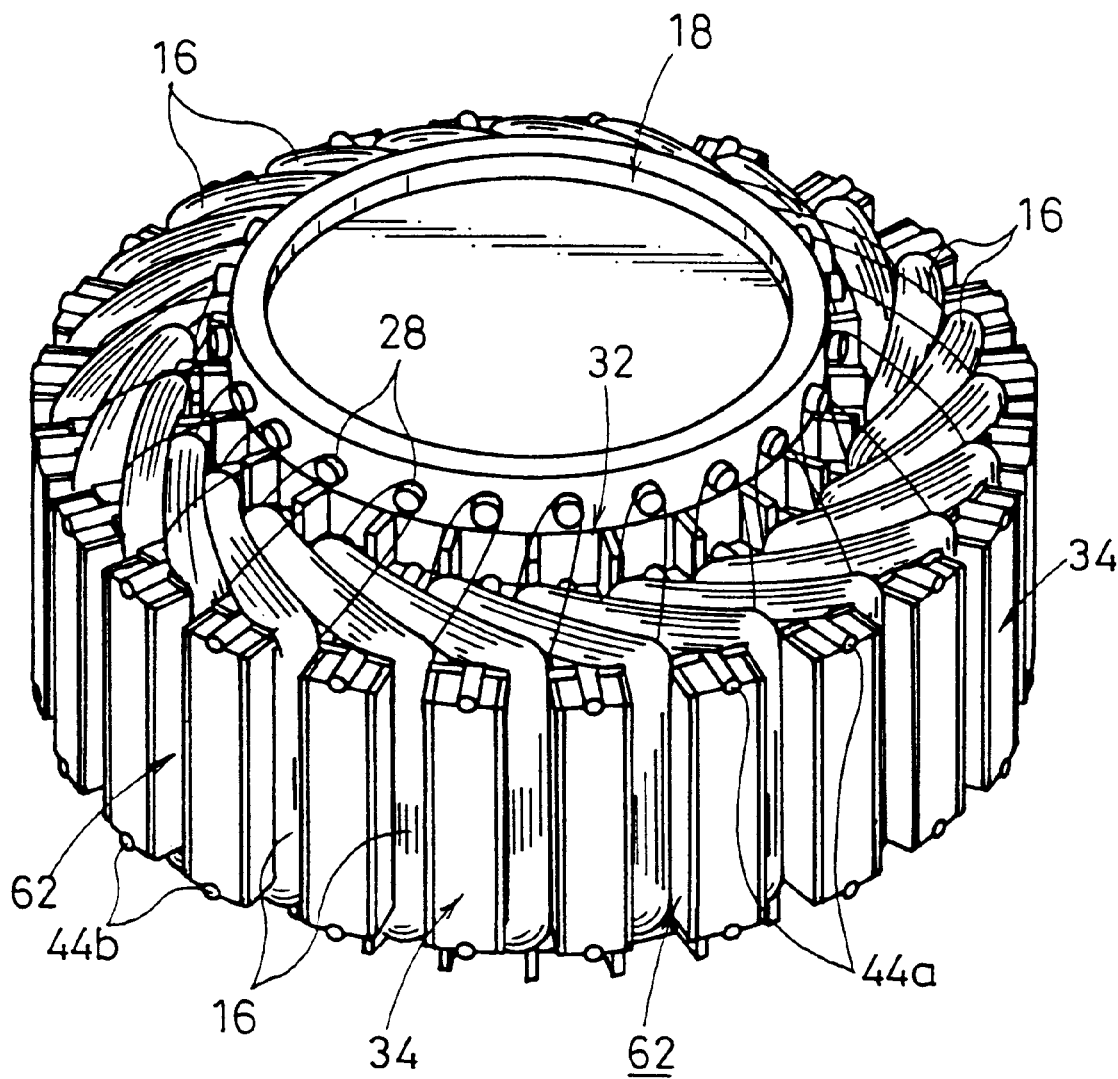
FIG. 17 shows a perspective view illustrating a process in which the core jig is subjected to winding by the aid of the holding jigs and the stator core jigs.

As shown in FIG. 17, the stator core jigs 34 and the pin members 44a, 44b are subjected to winding in an integrated manner by the aid of the winding openings 68 of the insulators 62. Thus, the winding coils 16 are formed around the core jig 32. During this process, the fastening pins 28, which are provided on the commutator member 18, are subjected to winding. The core jig 32 is provided with the plurality of projections 40 which protrude in the radial direction. The stator core jigs 34 are not subjected to winding at their regions corresponding to the length of the projections 40 in the radial direction.

Figure 18:
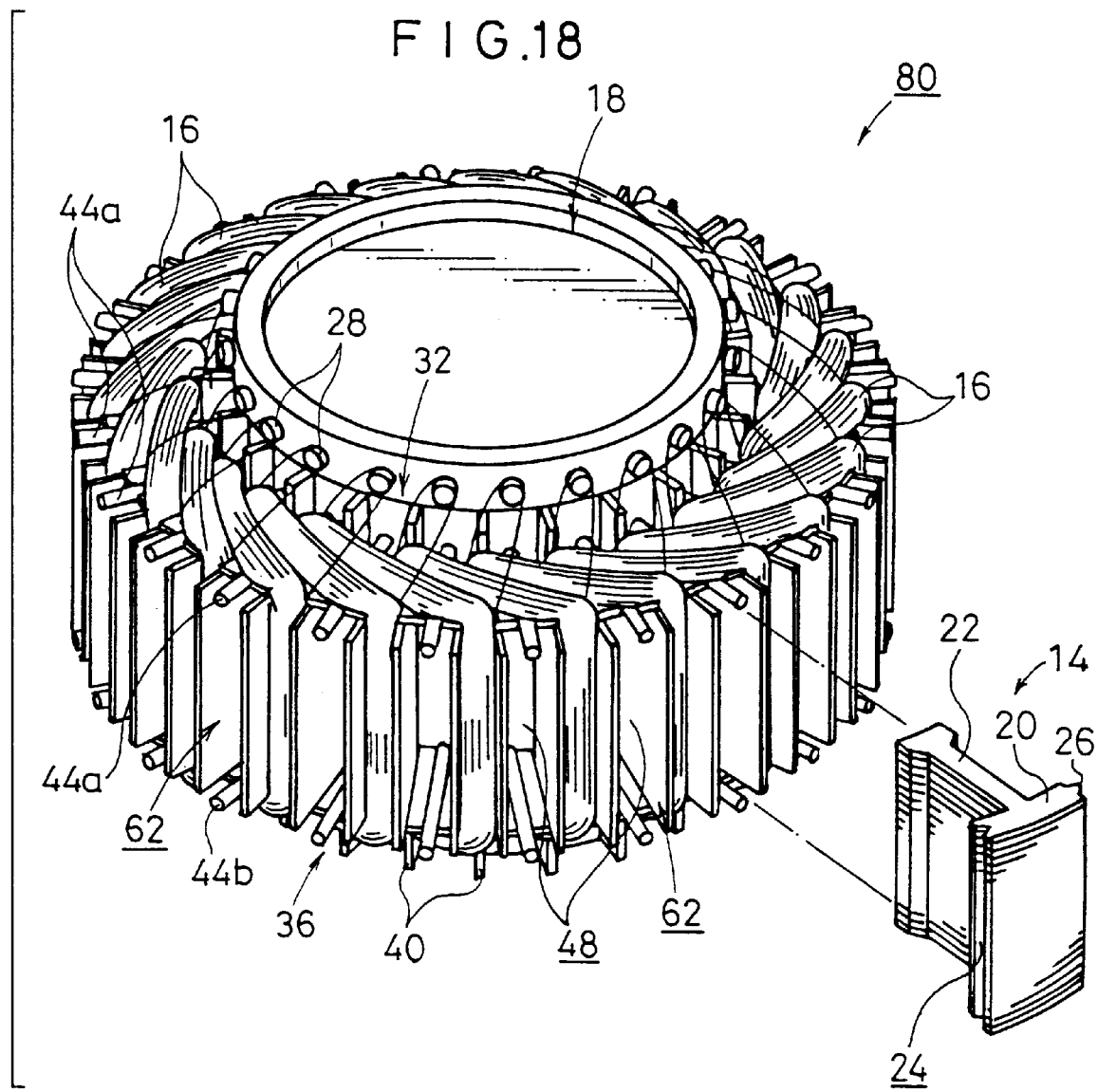
FIG. 18 shows a perspective view illustrating a process in which stator cores are installed to the windings in place of the stator core jigs.
Figure 19:
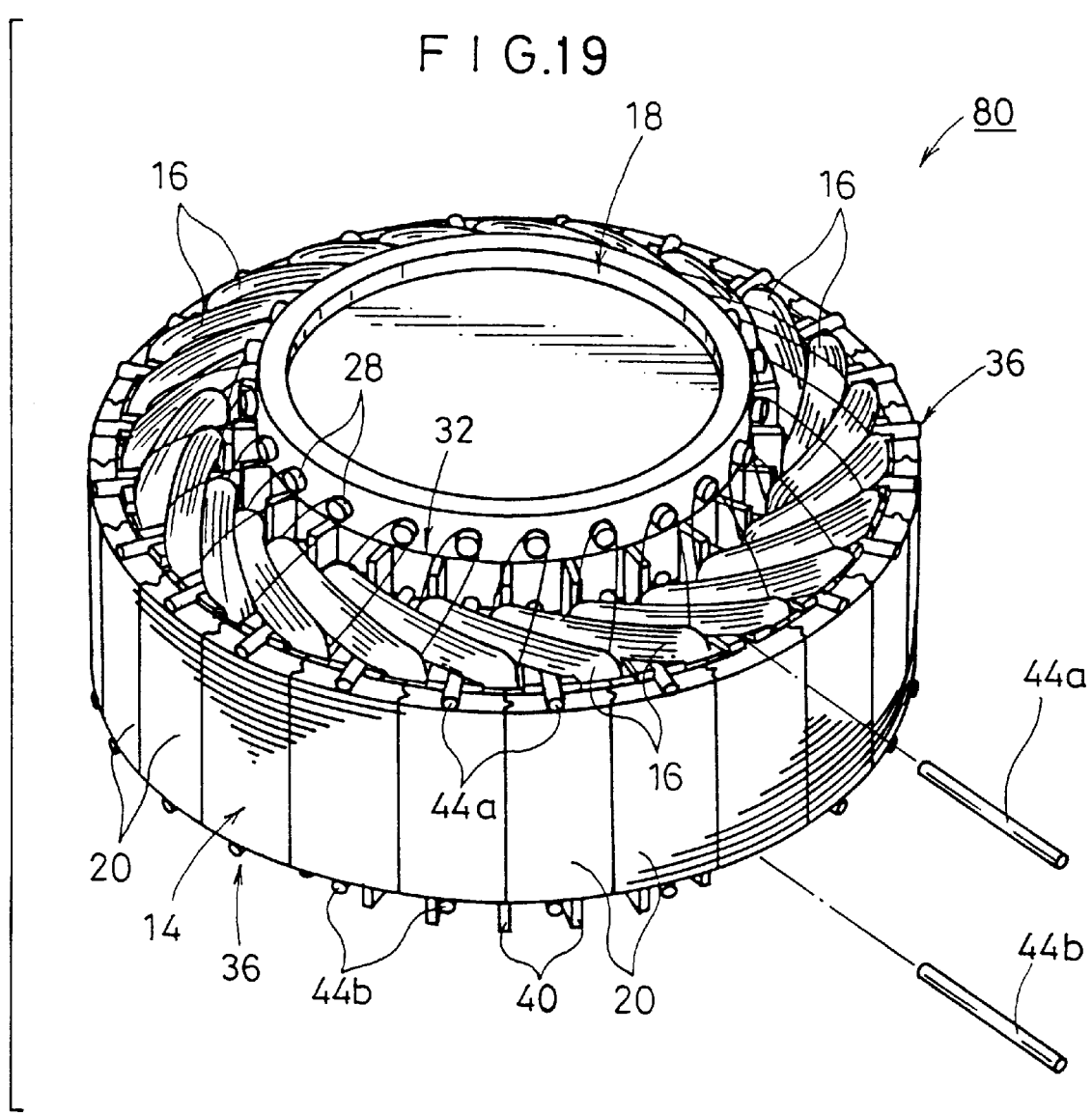
FIG. 19 shows a perspective view illustrating a state in which the stator cores are installed.

After completion of the winding operation, the stator core jigs 34 are removed from the core jig 32. When the stator core jigs 34 are removed, as shown in FIG. 18, openings 48 are formed by the winding coils 16, the pin members 44a, 44b, and the insulators 62. The stator cores 14 are inserted into the openings 48. Specifically, the legs 22 of the stator cores 14 are successively inserted into the openings 48. The recess 24, which is provided at the head 20 of one stator core 14, is fitted to the projection 26 which is provided at the head 20 of the other stator core 14. Accordingly, as shown in FIG. 19, the respective stator cores 14 are arranged in the annular configuration.

Further, the pin members 44a, 44b are withdrawn from the core jig 32, and then the outer diametral ring 12 is installed to the outer circumference of the stator cores 14 (see FIG. 20). The core jig 32 is removed from the winding coils 16. Thus, the stator 60 is obtained.

In this second embodiment, at first, the insulators 62 are installed between the stator core jigs 34 in the state in which the stator core jigs 34 are installed to the core jig 32 by the aid of the holding jigs 36. Subsequently, the stator core jigs 34 and the holding jigs 36 are subjected to winding to form the winding coils 16, and then the stator core jigs 34 are replaced with the stator cores 14 which are installed to the openings 48 of the winding coils 16.

During this process, the bending protruding tabs 70a, 70b of the insulators 62 are bent in the direction (inwardly) to make approach to one another. Thus, the head 20 of the stator core 14 and the winding coil 16 are reliably prevented from electric connection.

As described above, the insulators 62 can be allowed to intervene between the stator cores 14 and the winding coils 16 only by installing the insulators 62 between the stator core jigs 34. Therefore, an advantage is obtained in that the productivity of the stator 60 provided with the insulators 62 is improved all at once, and the entire winding operation is performed easily and quickly.

In the second embodiment, the insulator 62 is provided with the bending protruding tabs 70a, 70b. However, one bending protruding tab 70a may be formed to have a long size, and the other bending protruding tab 70b may be unnecessary.

As described above, according to the winding method and the winding apparatus for producing stators for electric motors concerning the present invention, the stator core jigs, which are installed to the core jig by the aid of the holding jigs, are subjected to winding, and then the stator core jigs are replaced with the stator cores which are installed to the windings. Therefore, especially, the stator cores can be subjected to winding to span the plurality of stator cores, only by exchanging the plurality of divided stator cores with the stator core jigs. Thus, the entire winding operation is performed easily and quickly.

Further, according to the winding method and the winding apparatus for producing stators for electric motors concerning the present invention, the winding procedure is applied to the commutator member and the stator core jigs installed to the core jig by the aid of the holding jigs, and then the stator core jigs are replaced with the stator cores which are installed to the windings. Therefore, the entire winding operation is performed easily and quickly only by exchanging the plurality of divided stator cores with the stator core jigs.

Furthermore, according to the winding method and the winding apparatus for producing stators for electric motors concerning the present invention, the insulators are allowed to intervene between the stator core jigs installed to the core jig by the aid of the holding jigs, and then the stator core jigs are subjected to winding. Subsequently, the stator core jigs are replaced with the stator cores which are installed to the windings. Therefore, it is possible to easily and quickly perform the entire winding operation effected for the stator cores while allowing the insulators to intervene therebetween.

What is claimed is:

1. A winding apparatus for producing stators for electric motors, wherein a plurality of stator cores divided to have a tooth-shaped configuration are assembled into an annular structure, and said stator cores are subjected to winding to form a stator, said apparatus comprising:

a core jig having a circular outer circumference;

a plurality of plate-shaped stator core jigs designed to have a configuration corresponding to said stator cores; and a plurality of holding jigs each projecting radially outwardly from said outer circumference of said core jig and having ends which are installed detachably to said outer circumference of said core jig for temporarily holding said stator core jigs, each of said holding jigs comprising a pair of pin members, wherein ends of said pin members are installed to said core jig while being separated from each other in an axial direction, and wherein said stator core jigs are detachably held against said outer circumference of said core jig by said holding jigs, such that said stator core jigs project radially outwardly from said outer circumference of said core jig.

2. The winding apparatus according to claim 1, wherein said core jig has one end with its outer diameter which is designed to be fitted to a commutator member.

3. The winding apparatus according to claim 1, wherein a plurality of plate-shaped projections are formed on an outer circumferential surface of said core jig separated from each other by equal angular intervals, wherein each of said plate-shaped projections projects in a radial outward direction and extends in an axial direction of said core jig.

4. The winding apparatus according to claim 1, wherein said stator core jigs are provided with positioning recesses for making engagement with respective pairs of said pin members.

5. The winding apparatus according to claim 4, further comprising insulators interposed between said stator core jigs and comprising vertical plates engaging sides of said stator core jigs and horizontal plates engaging said pin members.

6. The winding apparatus according to claim 5, wherein each of said pin members has circular arc-shaped recesses diametrically disposed on both sides thereof for making engagement with said horizontal plates of said insulators.

* * * * *

UNITED STATES PATENT AND TRADEMARK OFFICE
CERTIFICATE OF CORRECTION

PATENT NO. : 6,141,865

DATED : November 7, 2000

INVENTOR(S): Osamu KAKUTANI et al.

It is certified that error appears in the above-identified patent and that said Letters Patent are hereby corrected as shown below:

Title page item [54], change the title from "WINDING METHOD AND WINDING APPARATUS FOR PRODUCING STATORS FOR ELECTRIC MOTORS" to -- WINDING APPARATUS FOR PRODUCING STATORS FOR ELECTRIC MOTORS --.

Signed and Sealed this

Fifteenth Day of May, 2001

*Attest:*

NICHOLAS P. GODICI

*Attesting Officer*  Acting Director of the United States Patent and Trademark Office